(12) United States Patent
Giles

(10) Patent No.: US 6,538,688 B1
(45) Date of Patent: Mar. 25, 2003

(54) METHOD AND APPARATUS FOR PERFORMING AN AUTOMATED INVERSE TELECINE PROCESS

(75) Inventor: Darren A. Giles, Los Gatos, CA (US)

(73) Assignee: Terran Interactive, Los Gatos, CA (US)

(*) Notice: Subject to any disclaimer, the term of this patent is extended or adjusted under 35 U.S.C. 154(b) by 0 days.

(21) Appl. No.: 09/109,621

(22) Filed: Jul. 2, 1998

(51) Int. Cl.[7] .............. H04B 1/66; H04N 3/36; H04N 5/253; H04N 9/11; H04N 9/47
(52) U.S. Cl. .............................................. 348/97
(58) Field of Search .................. 348/95, 96, 97, 348/98, 99, 452, 558, 459, 465; 382/232, 100; 386/52; H04B 1/66; H04N 3/36, 5/253, 9/11, 9/47

(56) References Cited

U.S. PATENT DOCUMENTS

| | | | | | |
|---|---|---|---|---|---|
| 5,517,246 | A | * | 5/1996 | Isoda | 348/459 |
| 5,532,751 | A | * | 7/1996 | Lui | 348/452 |
| 5,930,445 | A | * | 7/1999 | Peters et al. | 386/52 |
| 5,988,863 | A | * | 11/1999 | Demos | 364/715.02 |
| 6,031,927 | A | * | 2/2000 | Rao et al. | 382/100 |
| 6,097,439 | A | * | 8/2000 | Goldberg | 348/465 |
| 6,115,499 | A | * | 9/2000 | Wang et al. | 382/232 |

FOREIGN PATENT DOCUMENTS

| | | |
|---|---|---|
| EP | 0685968 | 12/1995 |
| EP | 0730378 | 9/1996 |
| EP | 0612187 | 8/1999 |
| WO | WO95/15659 | 6/1995 |

* cited by examiner

Primary Examiner—Chris Kelley
Assistant Examiner—Tung Tu Vo
(74) Attorney, Agent, or Firm—Gates & Cooper LLP (57) ABSTRACT

A method and apparatus for performing an inverse telecine process is provided. For the method of the present invention, a computer system reads a series of frames in an input video sequence. The pixels in each frame are analyzed to determine if the frame is a composite frame produced by a prior telecine process. Frames that are determined to be composite frames are reconstructed, when practical, using their immediately preceding frames. Composite frames that cannot be reconstructed are transformed into interpolated frames. The computer system adds the reconstructed frames, along with the frames that did not need to be reconstructed, to an output video sequence.

15 Claims, 6 Drawing Sheets

METHOD AND APPARATUS FOR PERFORMING AN AUTOMATED INVERSE TELECINE PROCESS

FIELD OF THE INVENTION

The present invention relates generally to video processing systems. More specifically, the present invention includes a method and apparatus for processing a video sequence that automatically reconstructs the original frames from the output of a preceding telecine process.

BACKGROUND OF THE INVENTION

The film used to record and project motion pictures is divided into a sequence of individual images known as frames. Video tape is encoded using a similar sequence of frames. As a result, it might appear that converting between film and video tape would be a simple process of transferring frames from the source media to equivalent frames within the destination media. Unfortunately, film and video tape are recorded using different frame rates. For film, the rate is typically twenty-four frames for each second. Video tape encoded using the NTSC standard uses a rate of approximately thirty frames per second. Video tape encoded using the PAL standard uses a rate of approximately twenty-five frames per second.

The different frame rates used by film and video complicates the conversion between the two types of media. Specifically, when converting from film to video tape, each second of film must be expanded from twenty-four to thirty frames. Effectively, an extra, or composite video frame must be made up or fabricated for each four frames of film. When converting from video tape to film, each second of video tape must be reduced from thirty to twenty-four frames. This means that one frame out of every five frames of video tape must be discarded.

The process of converting from film to video is known as telecine. Typical telecine processes create composite frames using an interlacing method. The interlacing method takes advantage of the fact that video frames are divided into an odd field and an even field. The even field includes all of the even lines within the video frame. The odd field includes all of the odd lines within the frame. An extra, or composite frame is created by combining the odd field from one frame with the even field from an adjacent second frame. The composite frame is is intended to approximate a midway point between frames and is inserted between the first and second frames.

The frames added by the telecine process make recordings made on film viewable in video formats. There are many cases, however, where it is desirable to remove the frames added during the telecine process. One of these cases At arises when video data needs to be compressed. Compression is used where it is necessary to reduce the number of bits used to digitally encode video data. Compression increases the capacity of storage devices, such as optical disks. Compression also increases the performance of video transmissions, such as satellite or Internet transmissions. Unfortunately, the composite frames produced by the telecine process tend to disrupt the compression process. This occurs because the output frame rate is higher (resulting in a greater amount of data), and because composite frames tend to be different than both their preceding and following frames. These differences introduce additional discontinuities in the sequence of frames. Video compression methods, such as MPEG, are most effective when applied to relatively continuous frame sequences. These compression methods exhibit lower efficiencies when they are applied to sequences of frames that have been processed through the telecine process.

The traditional method for removing composite frames requires an operator to manually detect the first composite frame by searching through the sequence of frames encoded on a video tape. The composite frame is then discarded. Each following fifth frame may then be discarded as well. In practice, this method suffers from at least two deficiencies. The first is the requirement that an operator manually scan through frames looking for the initial composite frame. The second, and potentially more serious, deficiency arises when composite frames are to be removed from a video tape that has been edited after the telecine process. In these cases, frames within the video tape may have been removed or added. This means that composite frames may occur at rather random intervals and not every fifth frame. The result is that the process of manually selecting the initial composite frame may have to be repeated. If a video tape includes a large number of edits, the manual selection process may become extremely time consuming or impractical.

As a result, it is clear that there is a need for a process that automatically removes the composite frames generated by the telecine process. This is especially important where the composite frames cannot be assumed to occur on a strictly periodic basis, as the case of an edited video tape.

SUMMARY OF THE INVENTION

An embodiment of the present invention provides a method and apparatus for performing an inverse telecine process. The inverse telecine process automatically detects and replaces composite frames created during a preceding telecine process. For the method of the present invention, a computer system reads each of the frames in a source video sequence. The computer system uses the frames to create an output video sequence.

During this process, the computer system analyzes the pixels included in each frame read from the source video sequence. If the pixels included in the even field of a frame correspond to the adjacent pixels included in the odd field, the computer system concludes that the frame is original. An original frame includes pixels from only one image. Original frames are added, without modification, to the destination video sequence.

If the pixels included in the even field of a frame do not correspond to their adjacent pixels included in the odd field, the computer system concludes that the frame is composite. A composite frame includes pixels from two distinct images and is created during a telecine process. When a composite frame is detected, the computer system attempts to reconstruct the composite frame to form an original frame.

To reconstruct composite frames into original frames, the computer system compares the pixels included in the composite frame to the pixels included in the frame that precedes the composite frame in the source video sequence. If the pixels included in the even field of the composite frame correspond to their adjacent pixels included in the odd field of the preceding frame, the computer system reconstructs an original frame using the even field of the composite frame and the odd field of the preceding frame. If the pixels included in the odd field of the composite frame correspond to their adjacent pixels included in the even field of the preceding frame, the computer system reconstructs an original frame using the odd field of the composite frame and the even field of the preceding frame. The computer system adds reconstructed frames to the destination video sequence.

The computer system creates interpolated frames for composite frames that cannot be reconstructed. The computer system creates interpolated frames by applying an interpolation function to the pixels included in the composite frames. The computer system adds interpolated frame to the destination video sequence only if they cannot be discarded without compromising the synchronization between the source and destination video sequences.

The method of the present invention performs the inverse telecine process using only a single pass and is self-adapting to a variety of different input and output frame rates. The automatic detection of composite frames means that the method is self-synchronizing and automatically adapts to discontinuities introduced during the editing process.

Advantages of the invention will be set forth, in part, in the description that follows and, in part, will be understood by those skilled in the art from the description herein. The advantages of the invention will be realized and attained by means of the elements and combinations particularly pointed out in the appended claims and equivalents.

BRIEF DESCRIPTION OF THE DRAWINGS

The accompanying drawings, that are incorporated in and constitute a part of this specification, illustrate several embodiments of the invention and, together with the description, serve to explain the principles of the invention.

DETAILED DESCRIPTION OF THE PREFERRED EMBODIMENTS

Reference will now be made in detail to preferred embodiments of the invention, examples of which are illustrated in the accompanying drawings. Wherever convenient, the same reference numbers will be used throughout the drawings to refer to the same or like parts.

Environment

Figure 1:
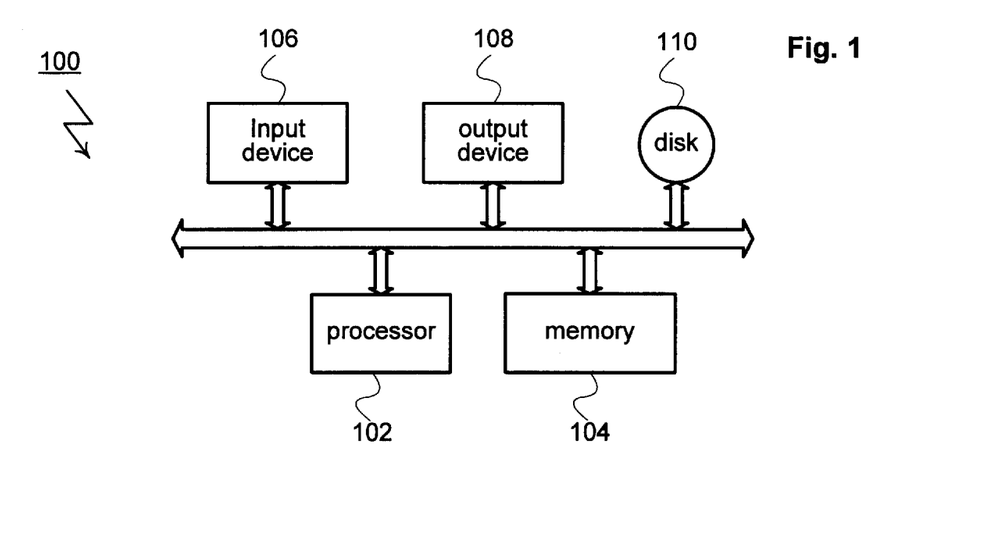
FIG. 1 is a block diagram of a host computer system shown as an exemplary environment for an embodiment of the present invention.

In FIG. 1, a computer system 100 is shown as a representative environment for the present invention. Structurally, computer system 100 includes a processor, or processors 102, and a memory 104. An input device 106 and an output device 108 are connected to processor 102 and memory 104. Input device 106 and output device 108 represent a wide range of varying I/O devices such as disk drives, keyboards, modems, network adapters, printers and displays. Each node 102 may also includes a disk drive 110 of any suitable disk drive type (equivalently, disk drive 110 may be any non-volatile mass storage system such as "flash" memory).

Inverse Telecine Process

Figure 2:
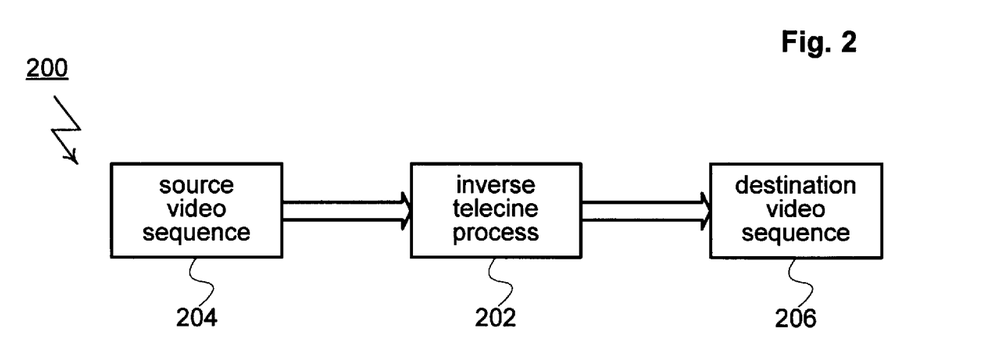
FIG. 2 is a block diagram of an inverse telecine process in accordance with an embodiment of the present invention.

An embodiment of the present invention includes a method and apparatus for performing an inverse telecine process. The inverse telecine process automatically detects and replaces or discards composite frames created during a preceding telecine process. As shown in FIG. 2, a representative telecine process 202 accepts a source video sequence 204 as input and creates a destination video sequence 206 as output. Source video sequence 204 and destination video sequence 206 are video data encoded as sequences of individual frames. For the purposes of the present invention, source video sequence 206 may be encoded using any suitable video format, such as QUICKTIME, AVI, DV or MPEG, or. This means that source video sequence 206 may be taken from a wide range of different sources, including computer networks, video tapes and optical disks. Destination video sequence 206 may be created using any suitable video format (i.e., QUICKTIME, AVI, DV or MPEG). This allows destination video sequence 206 to be created for a range of different destinations including, once again, computer networks, video tapes and optical disks. For some embodiments, different video formats will be used for source video sequence 204 and destination video sequence 206.

Figure 3:
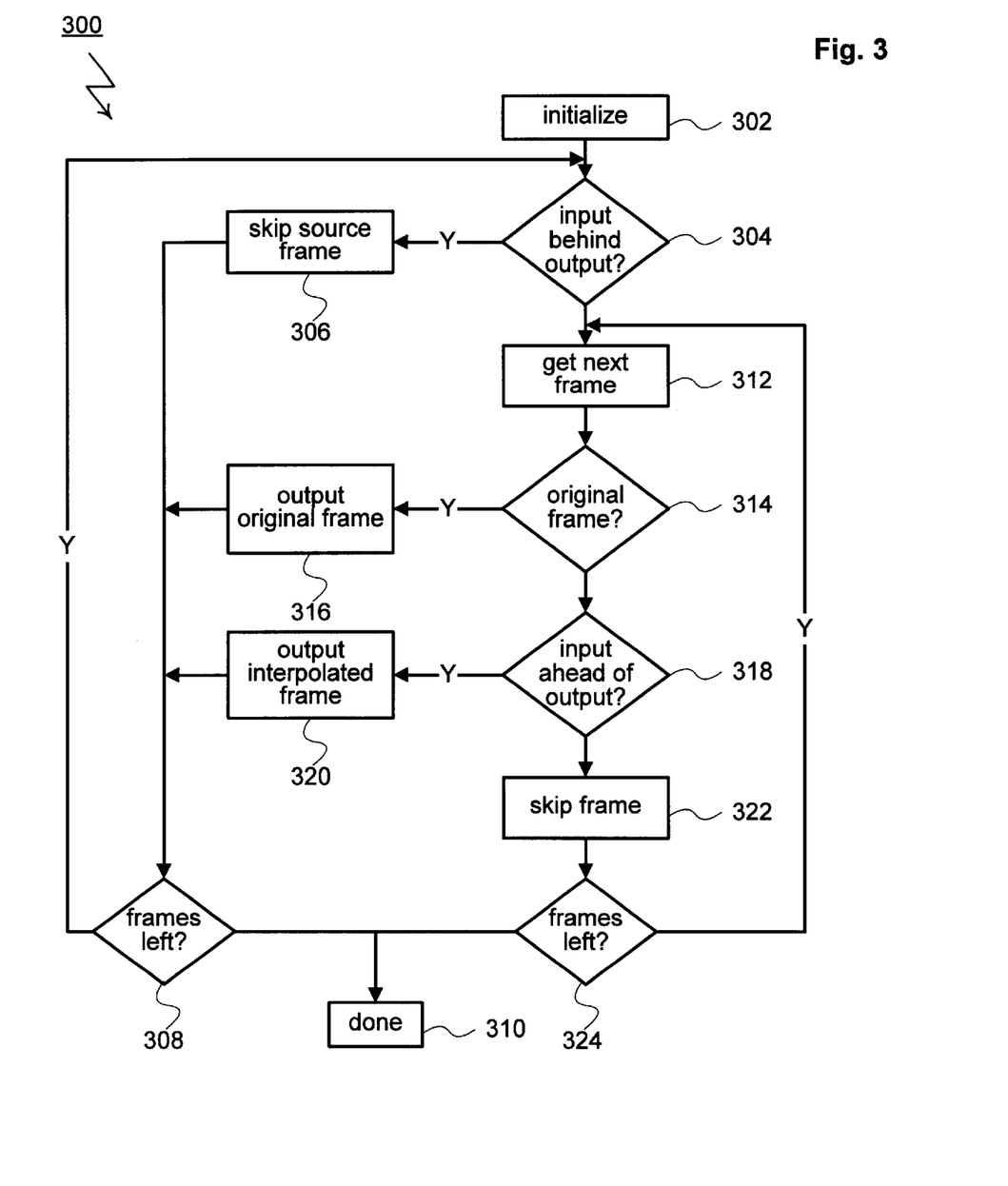
FIG. 3 is a flow chart showing the steps associated with an inverse telecine process as used by an embodiment of the present invention.

In FIG. 3, a representative implementation of inverse telecine process 202 is shown as method 300. Method 300 includes a series of steps performed by computer system 100 during transformation of source video sequence 204 to destination video sequence 206. Method 300 begins with initialization step 302. In step 302, computer system 100 performs any sub-steps that are required prior to execution of the main steps of method 300. In particular, computer system 100 initializes a source timer and a destination timer. Computer system 100 uses the source timer to track the number of seconds of source video sequence 204 that have been consumed. Computer system 100 uses the destination timer to track the number of seconds of destination video sequence 206 that have been produced. In step 302, computer system 100 initializes both of these timers to zero.

In step 304, computer system 100 determines if the input of the inverse telecine process is falling behind the output of the inverse telecine process. To make this determination, computer system 100 compares the start time of the next frame to be processed in source video sequence 204 (i.e., the source timer) to the start time of the next frame to be added to output video sequence 206 (i.e., the destination timer). During the first execution of step 304, both of these timers are zero and execution of method 300 automatically continues at step 312. In subsequent executions, computer system 100 moves to step 306 if the destination timer leads the source timer by a frame or more. In the alternative (i.e., if the destination timer does not lead the source timer by a frame or more), computer system 100 moves to step 312.

In the case where the input is falling behind the output, execution of method 300 continues at step 306. In step 306, computer system 100 skips over one of the frames included in source video sequence 204. The skipped frame is discarded and is not transferred to destination video sequence 206. The value of the source timer is incremented by computer system 100 by an amount that is equal to the duration of the skipped frame. This allows computer system 100 to advance through source video sequence 204 to increase the synchronization between the source timer and the destination timer.

Following execution of step 306, computer system 100 continues execution of method 300 at step 308. In step 308, computer system 100 determines if there are any unprocessed frames remaining in source video sequence 204. In the negative case (where all frames have already been processed), computer system 100 ends method 300 at step 310. Where there are remaining frames left to be processed, computer system 100 continues method 300 with another iteration of step 304.

Figure 4A:
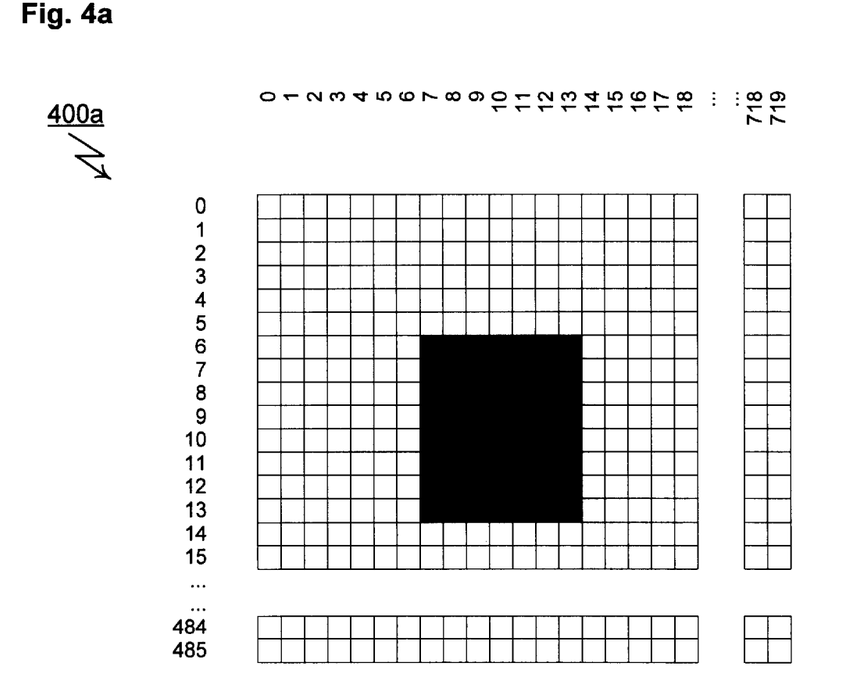
FIG. 4a is a block diagram of a first original video frame as exemplary input for an embodiment of the present invention.
Figure 4B:
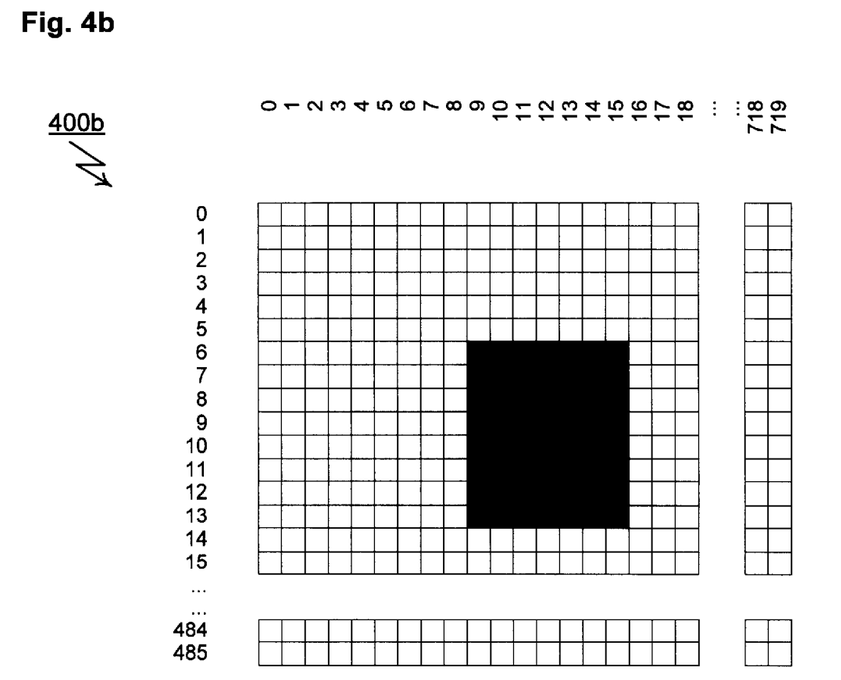
FIG. 4b is a block diagram of a second original video frame as exemplary input for an embodiment of the present invention.
Figure 4C:
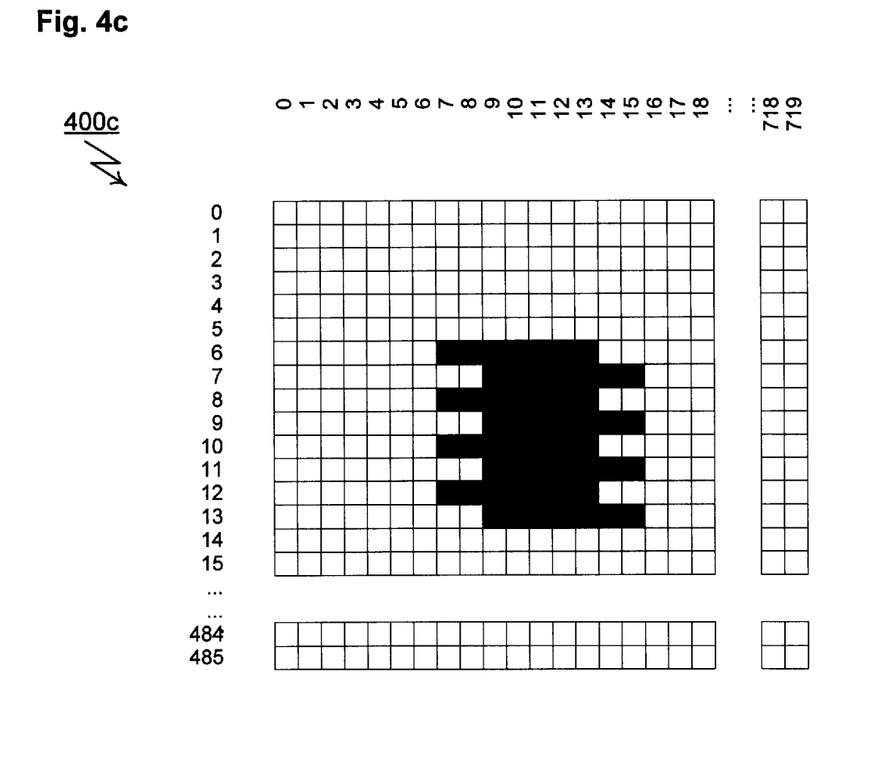
FIG. 4c is a block diagram of a composite video frame as exemplary input for an embodiment of the present invention.

In the case where the input of the inverse telecine process is not falling behind the output of the telecine process, computer system 100 continues execution of method 300 at step 312. In step 312, computer system 100 retrieves a frame from source video sequence 204. The frame retrieved during step 312 is one of two different types: original or composite. Original and composite frames are better understood by reference to FIGS. 4a through 4c. In FIG. 4a, a representative frame is shown and generally designated 400a. Frame 400a includes a series of 486 lines. Each line has 420 pixels. The lines within each frame are divided into an even frame and an odd frame. The even frame includes each even numbered line (i.e., lines 0, 2, 4, etc.) The odd frame includes each odd numbered line (i.e., lines 1, 3, 5, etc.).

A frame is original if the odd and even fields both contain pixel data from a single image. For the purposes of this description, it is assumed that FIG. 4a is original and includes a single image of a solid rectangle. Frame 400b of FIG. 4b includes the same image of a rectangle. In the case of frame 400b, however, the image of the rectangle has been shifted two pixels to the right. The shifted, solid rectangle is the only image included in frame 400b. For this reason, frame 400b is also an original frame.

A frame is composite if its odd and even fields contain pixel data from distinct images. This is the case for frame 400c of FIG. 4c. The even field of frame 400c contains the same pixel data as the even field of 400a. The odd field of frame 400c contains the same pixel data as the odd field of 400b. For this reason, frame 400c contains pixels data from two distinct images, the solid rectangle of frame 400a and the shifted, solid rectangle of FIG. 4b. Composite frames result when video sequence are transformed by a telecine process. Frame 400c is an intermediate frame that was inserted between frames 400a and frame 400b to adapt source video sequence 204 from a format having fewer frames per second (such as film) to a format having more frames per second (such as video). The telecine process creates frame 400c using the even field of frame 400a and the odd field of frame 400b. Since frames 400a and 400b include different images, frame 400c contains pixels data from two distinct images.

As mentioned, computer system 100 retrieves an original or a composite frame from source video sequence 204 during step 312. When practical, the frame retrieved in step 312 is original. In all other cases, the retrieved frame is composite. An embodiment of the method used by computer system 100 to get a next frame from source video sequence 204 is designated 500 in FIG. 5. Method 500 may be invoked as a subroutine or procedure. Alternately, method 500 may be included as inline code within method 300.

Figure 5:
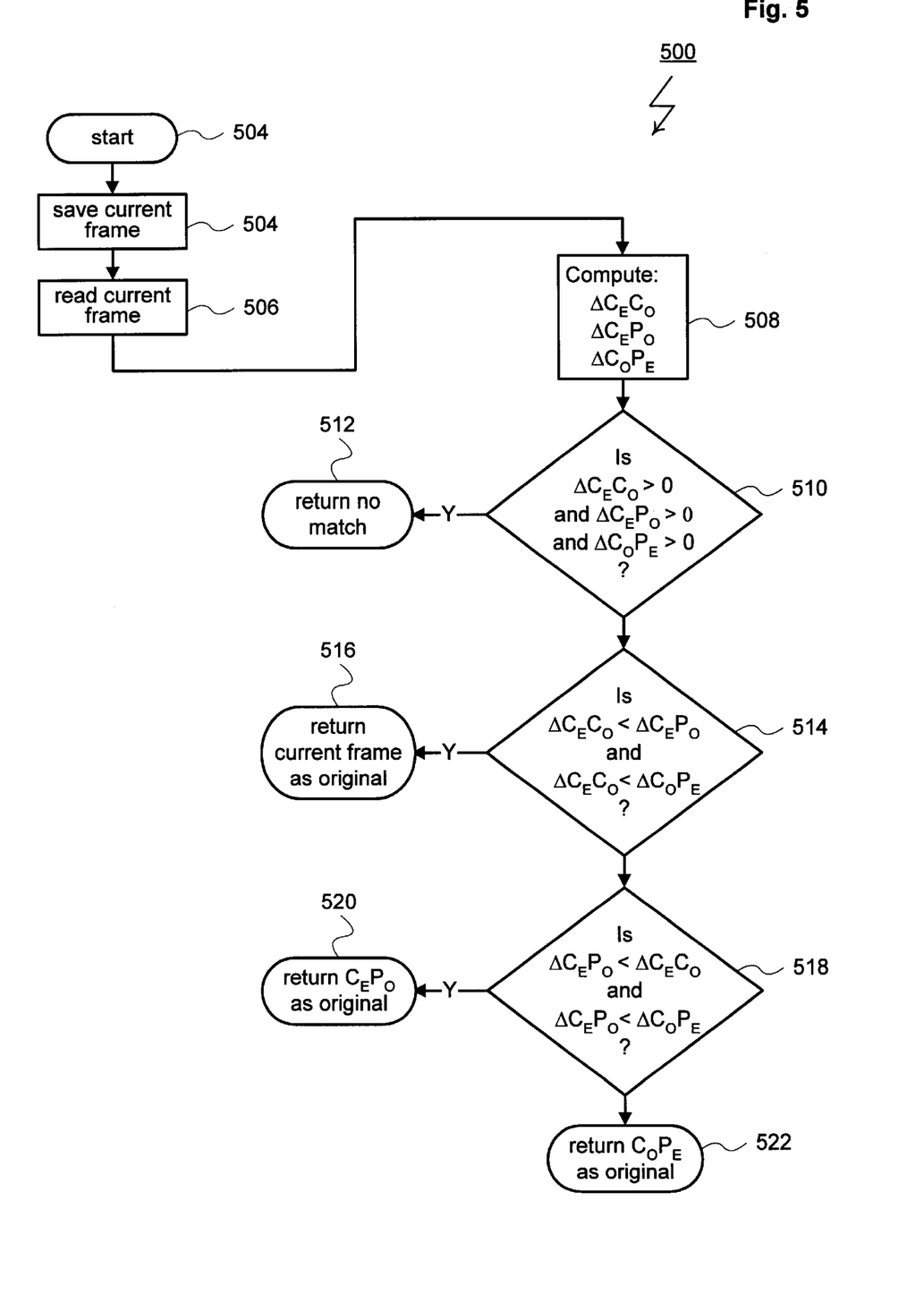
FIG. 5 is a flow chart showing the steps associated with a frame selection method telecine process as used by an embodiment of the present invention.

Method 500 begins, symbolically, with placeholder 502. During each invocation of method 500, computer system 100 reads a new frame from source video sequence 204. This frame is referred to as the current frame. Before updating the current frame, computer system 100 saves the old value (i.e., the frame read in the preceding invocation of method 500). The saved frame is referred to as the previous frame. In FIG. 5, the process of saving the current frame as the previous frame and reading a new frame to be the current frame are shown as steps 504 and 506, respectively. Both the previous frame and the current frame are stored in memory buffers or otherwise positioned to allow the pixels within the frames to be accessed. During step 506, computer system 100 increments the value of the source timer by an amount that is equal to the duration of the frame read from source video sequence 206.

In step 508, computer system 100 computes three values based on the pixels included in the current frame and the pixels included in the previous frame. The first of these values measures the similarity between pixels included in the even field of the current frame and adjacent pixels included in the odd field of the current frame. For the sake of convenience this value is referred to in this document as: $\Delta C_E C_O$. The second value calculated in step 508 measures the similarity between pixels included in the even field of the current frame and adjacent pixels included in the odd field of the previous frame. For the sake of convenience this value is referred to in this document as: $\Delta C_E P_O$. The final value calculated in step 508 measures the similarity between pixels included in the odd field of the current frame and adjacent pixels included in the even field of the previous frame. For the sake of convenience this value is referred to in this document as: $\Delta C_O P_E$.

To compute $\Delta C_E C_O$ computer system 100 selects a predetermined percentage of the pixels of the even field of the current frame. For each selected pixel, computer system 100 calculates a value that represents the degree of similarity between the selected pixel and nearby pixels within the odd field of the current frame. For one embodiment of the present invention, computer system 100 makes this calculation by comparing each selected pixel with four pixels that are vertically aligned with the selected pixel. This is shown more clearly in FIG. 6 where the selected pixel is shown at location x, y. Computer system 100 compares this selected pixel with its two vertically aligned and adjacent neighbors. These pixels are located at x, y+1 and x, y−1. Both of these pixels are included within the odd field of the current frame (since the selected pixel is included within the even frame). Computer system 100 also compares the selected pixel with the two pixels that are vertically aligned and separated by one pixel from selected pixel. These pixels are located at x, y+2 and x, y−2. Both of these pixels are included within the even field of the current frame (since the selected pixel is included within the even frame).

Figure 6:
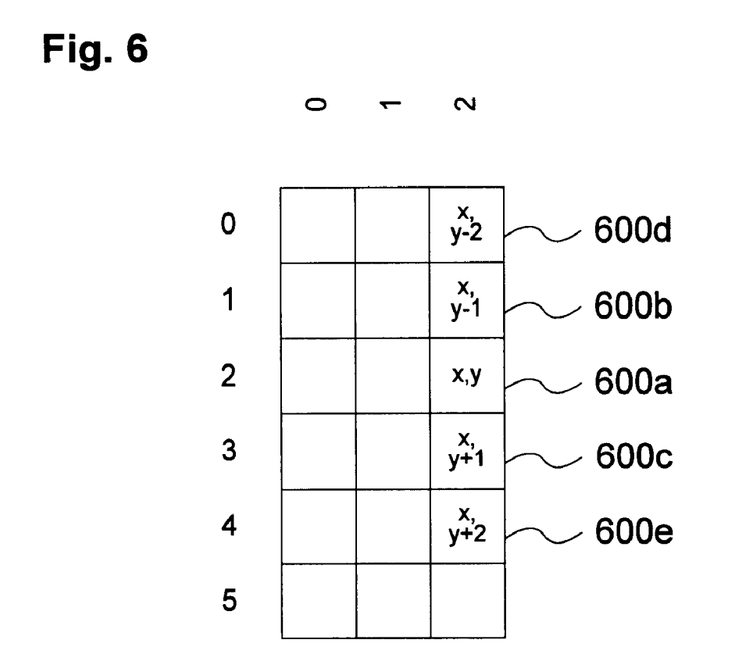
FIG. 6 is a detail showing a group of pixels in a video frame.

Computer system 100 compares each selected pixel to the pixels above and below the selected pixel using an equation of the form:

difference (x,y)=rgb_diff ((x,y),(x,y+1))+rgb_diff ((x,y),(x,y−1))−rgb_diff ((x,y),(x,y+2))−rgb_diff ((x,y),(x,y−2))

where rgb_diff (a,b) computes the difference between two pixels and b. Preferably, but not necessarily, rgb_diff (a,b) computes the difference between pixels a and b using the following equation:

$$\text{rgb\_diff}(a, b) = \sqrt{(red(a) - red(b))^2 + (green(a) - green(b))^2 + (blue(a) - blue(b))^2}$$

rgb_diff (a,b) returns small values when pixels a and b are similar and reaches zero when pixels a and b are equivalent. As a result, the function difference (x,y) tends to be negative when evaluated within original frames that include a single image. This follows because pixels within these frames tend to be more similar to nearby pixels and less similar to pixels father away. This causes the first two components of difference (x,y) (i.e., rgb_diff ((x,y),(x,y+1)) and rgb_diff ((x,y),(x,y−1))) to contribute a relatively small positive value while the second two components (i.e., rgb_diff ((x,y),(x,y+2)) and rgb_diff ((x,y),(x,y−2))) contribute larger negative values. This situation is reversed for composite frames that include two images. In these cases, pixels tend to be more similar to pixels within the same field. This means that pixels are more likely to resemble pixels two pixels away (vertically) than they are to immediately adjacent pixels. This means that the first two components of difference (x,y) contribute larger values than the second two components making the overall value of difference positive.

To compute $\Delta C_E C_O$ computer system 100 computes difference (x,y) for each selected pixel in the current frame. $\Delta C_E C_O$ is the sum of each computed value of difference (x,y). Negative values for $\Delta C_E C_O$ indicate that pixels within the current frame tend to be similar to their nearby pixels. This is expected for original frames that contain only a single image. Positive values for $\Delta C_E C_O$ indicate that pixels within the current frame tend to be different than their adjacent pixels but similar to pixels in the same field. This is expected for composite frames that contain two images.

Computer system 100 computes values for $\Delta C_E P_O$ and $\Delta C_O P_E$ using the same method used to compute $\Delta C_E C_O$. Before computing these values, however, computer system constructs two frames. The first constructed frame includes the even field from the current frame and the odd field from the previous frame. This frame is referred to as $C_E P_O$. The second constructed frame includes the odd field from the current frame and the even field from the previous frame. This frame is referred to as $C_O P_E$. Computer system 100 repeats the method used to calculate $\Delta C_E C_O$ using the first constructed frame ($C_E P_O$) to calculate $\Delta C_E P_O$. Computer system 100 then repeats the method used to calculate $\Delta C_E C_O$ using the second constructed frame ($C_O P_E$) to calculate $\Delta C_O P_E$.

In step 510, computer system 100 compares $\Delta C_E C_O$, $\Delta C_E P_O$ and $\Delta C_O P_E$ with zero. If each of these values is greater than zero, computer system 100 concludes method 500 at step 512. In step 512 computer system 100 returns the current frame and indicates that the returned frame is a composite frame.

In the alternative (i.e., where one of $\Delta C_E C_O$, $\Delta C_E P_O$ and $\Delta C_O P_E$ is less than zero) computer system 100 continues method 500 at step 514. In step 514, computer system 100 determines if $\Delta C_E C_O$ is less than $\Delta C_E P_O$ and $\Delta C_O P_E$. If so, computer system 100 concludes method 500 at step 516. In step 516 computer system 100 returns the current frame and indicates that the returned frame is an original frame.

In the alternative (i.e., where one of $\Delta C_E P_O$ or $\Delta C_O P_E$ is less than $\Delta C_E C_O$) computer system 100 continues method 500 at step 518. In step 518, computer system 100 determines if $\Delta C_E P_O$ is less than $\Delta C_E C_O$ and $\Delta C_O P_E$. If so, computer system 100 concludes method 500 at step 520. In step 520 computer system 100 returns the $C_E P_O$ frame and indicates that the returned frame is an original frame.

The final alternative to the series of tests made in steps 510, 514 and 518 is step 522. Computer system 100 reaches step 522 if $\Delta C_O P_E$ is less than $\Delta C_E C_O$ and $\Delta C_E P_O$. In step 522 computer system 100 returns the $C_O P_E$ frame and indicates that the returned frame is an original frame.

In cases where method 500 returns an original frame (i.e., steps 516, 520 and 522), the returned frame may include one or both fields from the current frame. Preferably, method 500 is configured so that the identity of these fields are tracked. This allows computer system 100 to determine whether a particular field has been previously used. Computer system 100 uses this information to avoid constructing and returning frame ($C_E P_O$) or frame ($C_O P_E$) where these frames would contain previously used frames.

Following the invocation of method 500, computer system 100 continues method 300 at step 314. In step 314, computer system 100 checks to see if method 500 returned an original or a composite frame. In the former case, computer system continues at step 314 by adding the returned frame to destination video sequence 206. Computer system 100 also increments the destination timer by an amount equal to the duration of the returned frame. Computer system 100 then continues method 300 at step 308 to determine if method 300 should continue to process remaining frames in video sequence 204 or terminate at step 310.

In the case where computer system 100 determines in step 314 that the frame is a composite frame, computer system 100 continues execution of method 300 at step 318. In step 318, computer system 100 determines if the input of the telecine process has gotten ahead of the output of the inverse telecine process. To make this determination, computer system 100 compares the start time of the returned frame (i.e., the source timer) to the start time of the next frame to be added to output video sequence 206 (i.e., the destination timer). Computer system 100 moves to step 320 if the source timer leads the destination timer by a frame or more. In the alternative (i.e., if the source timer does not lead the destination timer by a frame or more), computer system 100 moves to step 312.

In the case where input leads output, computer system 100 continues execution of method 300 at step 320. In step 320, computer system 100 uses the returned frame to create an interpolated frame. Each pixel (x, y) in the interpolated frame is computed using a weighted average of the same pixel (x, y) in the returned frame and two immediately adjacent pixels (x, y−1) and (x, y+1). For the purposes of the present invention many different interpolation functions may be used. One function that has been found to be particularly effective is:

interpolated frame (x, y)=0.25*subject frame (x, y−1)+0.50*subject frame (x, y)+0.25*subject frame (x, y+1)

Computer system 100 adds the interpolated frame to destination video sequence 206. Computer system 100 increments the destination timer by an amount equal. to the duration of the interpolated frame. Computer system 100 then continues method 300 at step 308 to determine if method 300 should continue to process remaining frames in video sequence 204 or terminate at step 310.

In the case where the input has not gotten ahead of the output, computer system 100 continues method 300 at 322. This causes the returned frame to be discarded, increasing the synchronization of input and output of the inverse telecine process. In step 322, computer system 100 discards the returned frame. Computer system 100 then continues execution of method 300 at step 324. In step 324, computer system 100 determines if there are any unprocessed frames remaining in source video sequence 204. In the negative case (where all frames have already been processed), computer system 100 ends method 300 at step 310. Where there are remaining frames left to be processed, computer system 100 continues method 300 with another iteration of step 312.

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A method for performing an inverse telecine process that comprises the steps, performed by a computer system, of:
   (a) retrieving a current frame and a preceding frame from a source video sequence;
   (b) determining if the current frame is an original frame by:
      (i) selecting a first pixel within the current frame;
      (ii) selecting a first group of one or more pixels in the current frame;
      (iii) selecting a second group of one or more pixels in the current frame where the pixels included in the second group are located farther from the selected pixel than the pixels included in the first group; and
      (iv) determining if the similarity between the second group of pixels and the selected pixel exceeds the similarity between the first group of pixels and the selected pixel;
   (c) adding, where the current frame is an original frame, the current frame to a destination video sequence;
   (d) determining, where the current frame is not an original frame, if an original frame can be reconstructed; and
   (e) adding, where an original frame can be reconstructed, a reconstructed frame to the destination video sequence.

2. A method as recited in claim 1 further comprising the step of: adding, where an original frame cannot be reconstructed, an interpolated frame to the destination video sequence.

3. A method as recited in claim 1 wherein the step of determining if an original frame can be reconstructed further comprises the steps of:
   creating a new frame, the new frame including a first field from the current frame and a second field of the previous frame;
   selecting a first pixel within the new frame;
   selecting a first group of one or more pixels within the new frame;
   selecting a second group of one or more pixels within the new frame where the pixels included in the second group are located farther from the selected pixel tan the pixels included in the first group; and
   determining if the similarity between the second group of pixels and the selected pixel exceeds the similarity between the first group of pixels and the selected pixel.

4. A computer program product comprising a computer usable medium having computer readable code embodied therein for performing an inverse telecine process, the computer program product comprising computer readable program code devices configured to cause a computer to:
   (a) retrieve a current frame and a preceding frame from a source video sequence;
   (b) determine if the current frame is an original frame, by:
      (i) selecting a first pixel within the current frame;
      (ii) selecting a first group of one or more pixels within the current frame;
      (iii) selecting a second group of one or more pixels within the current frame where the pixels included in the second group are located further from the selected pixel than the pixels included in the first group; and
      (iv) determining if the similarity between the second group of pixels and the selected pixel exceeds the similarity between the first group of pixels and the selected pixel;
   (c) add, where the current frame is an original frame, the current frame to a destination video sequence;
   (d) determine, where the current frame is not an orginal frame, if an original frame can be reconstructed; and
   (e) add, where an original frame can be reconstructed, a reconstructed frame to the destination video sequence.

5. A computer program product as recited in claim 4, wherein the computer readable program code devices are further configured to cause the computer system to add, where an original frame cannot be reconstructed, an interpolated frame to the destination video sequence.

6. A computer program product as recited in claim 5 wherein the computer readable program code devices are further configured to cause the computer to determine if an original frame can be constructed by:
   creating a new frame, the new frame including a first field from the current frame and a second field of the previous frame;
   selecting a first pixel within the new frame;
   selecting a first group of one or more pixels within the new frame;
   selecting a second group of one or more pixels within the new frame where the pixels included in the second group are located farther from the selected pixel than the pixels included in the first group; and
   determining if the similarity between the second group of pixels and the selected pixel exceeds the similarity between the first group of pixels and the selected pixel.

7. An apparatus for performing an inverse telecine process, the apparatus comprising:
   (a) means for retrieving a current frame and a preceding frame from a source video sequence;
   (b) means for determining if the current frame is an original frame, wherein said means further comprise:
      (i) means for selecting a first pixel with the current frame;
      (ii) means for selecting a first group of one or more pixels within the current frame;
      (iii) means for selecting a second group of one or more pixels within the current frame where the pixels included in the second group are located farther from the selected pixel than the pixels included in the first group; and
      (iv) means for determining if the similarity between the second group of pixels and the selected pixel exceeds the similarity between the first group of pixels and the selected pixel;
   (c) means for adding, where the current frame is an original frame, the current frame to a destination video sequence;
   (d) means for determining, where the current frame is not an original frame, if an original frame can be reconstructed; and
   (e) means for adding, where an original frame can be reconstructed, a reconstructed frame to the destination video sequence.

8. An apparatus as recited in claim 7 further comprising: means for adding, where an original frame cannot be reconstructed, an interpolated frame to the destination video sequence.

9. An apparatus as recited in claim 7 wherein the means for determining if an original frame can be reconstructed further comprises:

means for creating a new frame, the new frame including a first field from the current frame and a second field of the previous frame.

means for selecting a first pixel within the new frame;

means for selecting a first group of one or more pixels within the new frame;

means for selecting a second group of one or more pixels within the new frame where the pixels included in the second group are located farther from the selected pixel than the pixels included in the first group; and determining if the similarity between the second group of pixels and the selected pixel exceeds the similarity between the first group of pixels and the selected pixel.

10. A method for determining if a frame is an original frame, the method comparing the steps, performed by a computer system, of:

selecting a first pixel within the frame;

selecting a first group of one or more pixels within the frame;

selecting a second group of one or more pixels within the frame where the pixels included in the second group are located farther from the selected pixel than the pixels included in the first group; and determining if the similarity between the second group of pixels and the selected pixel exceeds the similarity between the first group of pixels and the selected pixel.

11. A computer program product comprising:

a computer usable medium having computer readable code embodied therein for determining if a frame is an original frame, the computer program product comprising:

first computer readable program code devices configured to cause a computer system to select a first pixel within the frame;

second computer readable program code devices configured to cause a computer system to select a first group of one or more pixels within the frame;

third computer readable program code devices configured to cause a computer system to select a second group of one or more pixels within the frame where the pixels included in the second group are located farther from the selected pixel than the pixels included in the first group; and fourth computer readable program code devices configured to cause a computer system to determine if the similarity between the second group of pixels and the selected pixel exceeds the similarity between the first group of pixels and the selected pixel.

12. An apparatus for determining if a frame is an original frame, the method apparatus:

means for selecting a first pixel within the frame;

means for selecting a first group of one or more pixels within the frame;

means for selecting a second group of one or more pixels within the frame where the pixels included in the second group are located farther from the selected pixel than the pixels included in the first group; and means for determining if the similarity between the second group of pixels and the selected pixel exceeds the similarity between the first group of pixels and the selected pixel.

13. A method for determining if an original frame can be reconstructed from a first frame and a second frame, the method comprising the steps, performed by a computer system, of:

constructing a third frame, the third frame including the even field from the first frame and the odd field from the second frame;

selecting a first pixel within the third frame;

selecting a first group of one or more pixels within the third frame;

selecting a second group of one or more pixels within the third frame where the pixels included in the second group are located farther from the selected pixel than the pixels included in the first group; and determining if the similarity between the second group of pixels and the selected pixel exceeds the similarity between the first group of pixels and the selected pixel.

14. A computer program product comprising a computer usable medium having computer readable code embodied therein for determining if an ordinal frame can be reconstructed from a first frame and a second frame, the computer program product comprising computer readable program code devices configured to cause a computer to:

construct a third frame, the third frame including the even field from the first frame and die odd field from the second frame;

select a first pixel within the third frame;

select a first group of one or more pixels within the third frame;

select a second group of one or more pixels within the third frame where the pixels included in the second group are located farther from the selected pixel than the pixels included in the first group; and determine if the similarity between the second group of pixels and the selected pixel exceeds the similarity between the first group of pixels and the selected pixel.

15. An apparatus for determining if an original frame can be reconstructed from a first frame and a second frame, the apparatus comprising:

means for constructing a third frame, the third frame including the even field from the first frame and the odd field from the second frame;

means for selecting a first pixel within the third frame;

means for selecting a first group of one or more pixels within the third frame;

means for selecting a second group of one or more pixels within the third frame where the pixels included in the second group are located farther from the selected pixel than the pixels included in the first group; and means for determining if the similarity between the second group of pixels and the selected pixel exceeds the similarity between the first group of pixels and the selected pixel.

* * * * *

UNITED STATES PATENT AND TRADEMARK OFFICE
CERTIFICATE OF CORRECTION

PATENT NO. : 6,538,688 B1  Page 1 of 1
DATED : March 25, 2003
INVENTOR(S) : Darren A. Giles It is certified that error appears in the above-identified patent and that said Letters Patent is hereby corrected as shown below:

Column 9,
Line 44, "tan" should read -- than --
Line 63, "further" should read -- farther --

Column 12,
Line 24, "ordinal" should read -- original --
Line 29, "die" should read -- the --

Signed and Sealed this

Sixteenth Day of September, 2003

JAMES E. ROGAN
*Director of the United States Patent and Trademark Office*